(12) United States Patent
Thommassen et al.

(10) Patent No.: US 11,592,325 B2
(45) Date of Patent: Feb. 28, 2023

(54) SOLID COLORANT DISPENSING UNIT AND TINTING MACHINE COMPRISING THE SAME

(71) Applicant: CHROMAFLO TECHNOLOGIES EUROPE B.V., Sittard (NL)

(72) Inventors: Peter Petronella Martinus Thommassen, Sittard (NL); Jeroen Hofman, Sittard (NL); Judith Jeanette Elisabeth Huijnen, Sittard (NL)

(73) Assignee: CHROMAFLO TECHNOLOGIES EUROPE B.V., Sittard (NL)

( * ) Notice: Subject to any disclaimer, the term of this patent is extended or adjusted under 35 U.S.C. 154(b) by 0 days.

(21) Appl. No.: 17/436,155

(22) PCT Filed: Mar. 5, 2020

(86) PCT No.: PCT/EP2020/055835
§ 371 (c)(1),
(2) Date: Sep. 3, 2021

(87) PCT Pub. No.: WO2020/182603
PCT Pub. Date: Sep. 17, 2020

(65) Prior Publication Data
US 2022/0099472 A1 Mar. 31, 2022

(30) Foreign Application Priority Data
Mar. 8, 2019 (EP) ..................................... 19161693

(51) Int. Cl.
*G01F 13/00* (2006.01)
*B01F 33/80* (2022.01)
*B01F 101/30* (2022.01)

(52) U.S. Cl.
CPC .......... *G01F 13/006* (2013.01); *B01F 33/805* (2022.01); *G01F 13/001* (2013.01); *B01F 2101/30* (2022.01)

(58) Field of Classification Search
CPC .... G01F 13/001; G01F 13/006; B01F 33/805; B01F 2101/30; B01F 33/84;
(Continued)

(56) References Cited

U.S. PATENT DOCUMENTS 2,642,206 A * 6/1953 Pollack et al. ............ B67C 3/04
422/216
2,923,438 A * 2/1960 Logan ................. B01F 35/3231
222/2

(Continued)

FOREIGN PATENT DOCUMENTS

| AU | 2003258985 A1 * | 1/2004 | ........ A61M 15/0003 |
| WO | WO-9612609 A1 * | 5/1996 | ......... B29C 67/0059 |

(Continued)

*Primary Examiner* — Patrick M. Buechner
(74) *Attorney, Agent, or Firm* — Hudak, Shunk & Farine Co. LPA (57) ABSTRACT

A solid colorant dispensing unit for dispensing charges of solid spherical colorant particles in a time-controlled way, the dispensing unit having a supply container having a nozzle for dispensing the particles having a number average particle size and a number particle size distribution, wherein a ratio of the standard deviation of the number particle size distribution to the number average particle size of the particles is less than 25%. The nozzle having a dispensing outlet having a diameter taking into account the number average particle size of the particles. The dispensing unit having a control assembly for controlling the dispensing of the charges of the particles by taking into account the properties of the particles and the diameter of the outlet of the nozzle. A tinting machine having the solid colorant dispensing unit.

23 Claims, 5 Drawing Sheets

(58) Field of Classification Search
CPC .... B01F 33/841; B01F 33/844; B01F 33/846; B01F 33/848; B01F 35/88; B01F 35/522; B01F 35/20; B01F 35/21; B01F 35/211; B01F 35/2111; B01F 35/21111; B01F 35/21112; B01F 35/2112; B01F 35/2113; B01F 35/2114; B01F 35/2115; B01F 35/21151; B01F 35/2116; B01F 35/2117; B01F 35/2134; B01F 35/22; B01F 35/221; B01F 35/2212; B33Y 50/02; B33Y 50/00
See application file for complete search history.

(56) References Cited

U.S. PATENT DOCUMENTS

| | | | |
|---|---|---|---|
| 4,850,304 A | | 7/1989 | Nicholson |
| 5,078,302 A | * | 1/1992 | Hellenberg ......... B01F 35/7174 |
| | | | 222/144.5 |
| 5,908,144 A | * | 6/1999 | Dalton ................ G01F 13/006 |
| | | | 222/282 |
| 9,052,034 B1 | | 6/2015 | Wegner et al. |
| 2005/0247730 A1 | * | 11/2005 | Post ...................... B01F 33/841 |
| | | | 222/1 |
| 2011/0041952 A1 | | 2/2011 | Gaultney |
| 2017/0051151 A1 | | 2/2017 | Thommassen et al. |
| 2018/0264490 A1 | | 9/2018 | Fushimi et al. |
| 2021/0370251 A1 | * | 12/2021 | Alvisi ...................... F04B 9/04 |

FOREIGN PATENT DOCUMENTS

| | | | | |
|---|---|---|---|---|
| WO | WO-0119579 A1 | * | 3/2001 | .......... B01F 13/0038 |
| WO | WO-0134470 A1 | * | 5/2001 | ........... B67D 1/0006 |
| WO | WO-0240179 A2 | * | 5/2002 | ........... B67D 1/0006 |

* cited by examiner

SOLID COLORANT DISPENSING UNIT AND TINTING MACHINE COMPRISING THE SAME

FIELD OF THE INVENTION

The present invention relates to a solid colorant dispensing unit configured to dispense at least one charge of solid spherical colorant particles in a time-controlled way. The invention further relates to a tinting machine configured to tint a base paint composition with at least one charge of solid spherical colorant particles dispensed in a time-controlled way by at least one solid colorant dispensing unit according to the invention.

BACKGROUND OF THE INVENTION

Paint and stain manufacturers typically distribute premixed paints and stains in a small number of popular colors. To meet consumer desires and enable matching of existing painted or stained surfaces, manufacturers typically also distribute a set of tintable paints and several concentrated colorants. These are combined at point-of-sale outlets using colorant dispensing units and shaker mixing equipment to make small batches of custom-tinted paint in a much larger array of colors than the limited color array available in premixed products.

Basically, colorant dispensing units known in the art are configured to dispense liquid or solid colorants. The present invention focuses on colorant dispensing units that are configured to dispense solid colorant particles.

Known solid colorant dispensing units generally use gravimetric dosing of the solid colorant particles for tinting a base paint composition. Gravimetric dosing can involve calculating the mass of solid colorant particles to be dosed using mathematical equations and determining said mass of the solid colorant particles using a scale.

A disadvantage of gravimetric dosing of solid colorant particles is that it is a rather delicate process, especially when small amounts of solid colorant particles are to be dosed. In such cases, small variations in the environment, such as vibrations or air turbulence, can cause significant weighing errors. As a result, tinted or colored paint compositions can be obtained that do not meet the required color specification.

Another disadvantage of gravimetric dosing of solid colorant particles is that the particles of different solid colorants have to be dosed sequentially as the particles of each individual solid colorant have to be weighed separately. As a result, using gravimetric dosing for the preparation of colored paint compositions involving particles of different solid colorants can be rather complex and costly as it requires quite some hardware, e.g. a scale and several containers, and is rather time consuming as a step-by-step principle involving multiple weightings is to be used to achieve accurate dosing. Moreover, gravimetric dosing of large amounts of solid colorants requires tinting in a separate container first because the scale cannot handle a large container comprising the base paint composition to be tinted. As a result of the weight limitation imposed by the scale, gravimetric dosing of large amounts of solid colorants needs to be performed in multiple steps.

US 2017/0051151 A1 discloses a testing device that is constructed for testing volumetric dosing of solid colorant particles. The testing device comprises a vessel or container that has an opening for dosing the solid colorant particles. The opening can be opened or closed by means of a plunger that can move up and down. By moving the plunger upwards, the dosing of the solid colorant particles through the opening under the influence of gravity is started for a determined period of time. When the plunger is moved down, the opening is closed and the dosing of the solid colorant particles stops.

The solid colorant particles have a number average particle size and a number particle size distribution, wherein a ratio of the standard deviation of the number particle size distribution to the number average particle size of the solid spherical colorant particles is less than 25%, wherein the number particle size distribution is determined with light scattering with fully automated image analysis according to ISO 13322-1:2004, Particle size analysis—Image analysis methods—Part 1: Static image analysis methods by the use of an OCCHIO ZEPHYR ESR analyzer.

A disadvantage of volumetric dosing of the solid colorant particles using the testing device according to US2017/0051151 A1 is that it does not allow volumetric dosing of the solid colorant particles with at least a same dosing accuracy as can be achieved using gravimetric dosing.

Based on the above, there is a need to provide an improved solid colorant dispensing unit that can be used in tinting machines for tinting a base paint composition and that pre-empts or at least reduces one or more of the abovementioned disadvantages associated with solid colorant dispensing units known in the art.

SUMMARY OF THE INVENTION

It is an object of the present invention to provide a solid colorant dispensing unit configured to dispense at least one charge of solid spherical colorant particles in a time-controlled way. The solid colorant dispensing unit according to the present invention pre-empts or at least reduces at least one of the abovementioned and/or other disadvantages associated with solid colorant dispensing units known in the art by enabling dispensing of solid spherical colorant particles in a less delicate and more efficient way while achieving at least a same dosing accuracy compared to the solid colorant dispensing units known in the art.

It is also an object of the present invention to provide a tinting machine configured to tint a base paint composition with at least one charge of solid spherical colorant particles dispensed in a time-controlled way by at least one solid colorant dispensing unit according to the invention. The tinting machine according to the present invention in which the solid colorant dispensing unit according to the present invention is applied enables improved control of the tinting of base paint compositions. As a result, the obtained tinted base paint compositions have at least the same performance but typically an improved performance compared to the performance of tinted base paint compositions that are obtained using gravimetric dosing of solid colorant particles.

Aspects of the present invention are set out in the accompanying independent and dependent claims. Features from the independent and dependent claims may be combined as appropriate and not merely as explicitly set out in the claims. Furthermore, all features may be replaced with other technically equivalent features.

At least one of the abovementioned objects is achieved by a solid colorant dispensing unit configured to dispense at least one charge of solid spherical colorant particles in a time-controlled way, the solid colorant dispensing unit comprising:

a supply container comprising a free end portion that is provided with a nozzle that is configured and arranged to dispense said at least one charge of solid spherical colorant particles during operation of the solid colorant dispensing unit, said solid spherical colorant particles having the following properties:
a number average particle size; and
a number particle size distribution, wherein a ratio of the standard deviation of the number particle size distribution to the number average particle size of the solid spherical colorant particles is less than 25%, preferably less than 22% and more preferably less than 20%, wherein the number particle size distribution is determined with light scattering with fully automated image analysis according to ISO 13322-1:2004, Particle size analysis—Image analysis methods—Part 1: Static image analysis methods by the use of an OCCHIO ZEPHYR ESR analyzer;
the nozzle comprising a dispensing outlet having a diameter taking into account the number average particle size of the solid spherical colorant particles; and
a control assembly that is configured and arranged to control dispensing of said at least one charge of solid spherical colorant particles in a time-controlled way by taking into account said properties of said solid spherical colorant particles and the diameter of the dispensing outlet of the nozzle.

The person skilled in the art will appreciate that the abovementioned time-controlled dosing of at least one charge of solid spherical colorant particles enables volumetric dosing of the solid spherical colorant particles instead of gravimetric dosing thereof. Volumetric dosing of the solid spherical colorant particles is faster than gravimetric dosing thereof as contrary to gravimetric dosing it does not require intermediate scale measurements of the solid spherical colorant particles to be dosed. Furthermore, volumetric dosing requires less hardware as scales and any additional containers regarding any intermediate scale measurements are not needed. Moreover, volumetric dosing enables simultaneous dosing of at least two charges of different solid spherical colorant particles. In this way dosing time can even further be reduced.

In addition, the person skilled in the art will appreciate that the properties of the solid spherical colorant particles, in particular the fact that the ratio of the standard deviation of the number particle size distribution to the number average particle size of the solid spherical colorant particles is less than 25%, preferably less than 22% and more preferably less than 20%, enable accurate volumetric dosing thereof. As a result of the well-defined shape and the narrow number particle size distribution of the solid spherical colorant particles, which are also referred to as pearls, the solid spherical colorant particles can be dispensed at a predictable and well-controllable flow rate. In addition, the narrow number particle size distribution of the solid spherical colorant particles enables a tap density and a bulk density of the solid spherical colorant particles to have respective values that are as close together as possible. Furthermore, as a result of their well-defined properties, especially shape and narrow number particle size distribution, the control assembly can control dispensing of at least one charge of the solid spherical colorant particles in a time-controlled way by taking into account said particle properties and the diameter of the dispensing outlet of the nozzle of the supply container. From the above it will be clear that solid colorant particles having at least one of an irregular shape and a broad or even bimodal number particle size distribution are not suitable for use with the solid colorant dispensing unit according to the present invention.

It is noted that the person skilled in the art will appreciate that particle size and particle size distribution of the solid colorant particles can be determined using any particle size and shape analyzer such as an OCCHIO ZEPHYR ESR analyzer that works according to ISO 13322-1:2004, Particle size analysis—Image analysis methods—Part 1: Static image analysis methods.

In the context of the present invention, an OCCHIO ZEPHYR ESR analyzer has been used that gives accurate size and shape analysis of free flowing powders with a particle size from 20 µm to 30 µm. Each sample of solid colorant particles is provided to a vibrating feeder where it is transported to a drop shaft to obtain gravity dispersion of the sample in the OCCHIO ZEPHYR ESR analyzer. Thereafter, a camera was used to take pictures from all particles in the focus. For each sample, the particle size of 50,000 particles was analyzed. The statistical evaluation was performed using CALLISTO software.

It is noted that a colorant is construed to be any substance (e.g. a dye, pigment, ink, or paint) that can impact color or can modify the hue of something else. A solid colorant is a solid composition, which can be added to a point-of-sale paint container whose interior volume is already largely (e.g. two thirds of the container volume or more) but not completely filled with a base paint composition so as to alter the hue or lightness of such base paint composition, and which composition contains pigment. An advantage of dispensing colorants that are solid spherical particles compared to colorants that are supplied particularly in powder form, is that the environment of the dispenser unit gets less dirty. In addition, the use of solid spherical colorant particles reduces the chance of inhalation by operators of the dispensing unit according to the present invention.

Based on the above, the person skilled in the art will appreciate that the solid colorant dispensing unit according to the present invention enables volumetric dosing of at least one charge of solid spherical colorant particles in a less delicate and more efficient way compared to using gravimetric dosing while achieving at least a same dosing accuracy.

In an embodiment of the solid colorant dispensing unit according to the invention, the control assembly comprises a solenoid comprising a spring-loaded plunger, wherein when the solenoid is in an inactive state, the spring-loaded plunger is configured and arranged with respect to the dispensing outlet of the nozzle so as to prevent the nozzle from dispensing solid spherical colorant particles, and when the solenoid is in an active state, the spring-loaded plunger is configured and arranged with respect to the dispensing outlet of the nozzle so as to allow the nozzle to dispense solid spherical colorant particles. By using a solenoid and a spring-loaded plunger it is possible to accurately dispense even very small charges of solid spherical colorant particles in a time-controlled way. In this way the solid colorant dispensing unit according to the present invention has dosing capabilities that are at least the same as dosing capabilities achievable by prior art solid colorant dispensing units. However, the solid colorant dispensing unit according to the present invention allows volumetric dosing which has the abovementioned advantages over the generally used gravimetric dosing techniques.

In an embodiment of the solid colorant dispensing unit according to the invention, the spring-loaded plunger of the solenoid is arranged such that its longitudinal centerline is directed transverse to the longitudinal centerline of the nozzle. The person skilled in the art will appreciate that in this way the spring-loaded plunger enables very fast and accurate control regarding opening and closing of the dispensing outlet of the nozzle and therefore of the dispensed charges of solid spherical colorant particles.

In an embodiment of the solid colorant dispensing unit according to the invention, the spring-loaded plunger has a free end part that is arrangeable with respect to the dispensing outlet of the nozzle so as to control dispensing of the solid spherical colorant particles, wherein said free end part has an outer circumference having a shape that is configured to ensure a uniform flow of dispensed solid spherical colorant particles when the free end part partially blocks the dispensing outlet. The person skilled in the art will appreciate that when the flow of dispensed solid spherical colorant particles is disturbed by the free end part of the spring-loaded plunger this will adversely affect the dosing accuracy. The flow of dispensed solid spherical colorant particles can be disturbed if the outer circumference has a shape providing sharp edges behind which the solid spherical colorant particles can get hooked. By providing the free end part of the spring-loaded plunger with an outer circumference having a shape that prevents the solid spherical colorant particles to get hooked behind its edges when flowing out of the dispensing outlet of the nozzle as long as it is partially blocked by the free end part, a uniform flow of dispensed particles can be ensured. As a result, a high dispensing accuracy can be achieved.

In an embodiment of the solid colorant dispensing unit according to the invention, a detection unit is provided that is configured and arranged to determine a current stock of solid spherical colorant particles in the supply container and to provide the control assembly with a detection signal corresponding to the determined current stock. In this way, it can be detected in time when the stock of solid spherical colorant particles in the container needs to be replenished. Hence, it can be avoided that the amount of solid spherical colorant particles in the supply container becomes so low that a linear dosing accuracy no longer applies. In addition, unnecessary down-time due to a shortage of solid spherical colorant particles can be avoided.

In an embodiment of the solid colorant dispensing unit according to the invention, the supply container comprises a first part having a free end portion that is provided with the nozzle and a second part having an end portion that is connected in open communication with an end portion of the first part that is arranged opposite the nozzle thereby providing a transition between the second part and the first part, the first part having a cone-shaped inner wall that with respect to its longitudinal centerline is arranged at an angle in a range of 15-55 degrees, preferably being equal to 30 degrees. As a result of the cone-shaped inner wall all solid spherical colorant particles are guided towards the dispensing outlet of the nozzle. The person skilled in the art will appreciate that the nozzle dispenses the solid spherical colorant particles at a flow rate that depends on the height and therefore on the amount of solid spherical colorant particles of the stock of solid spherical colorant particles that is present above the transition between the second part and the first part of the supply container. In addition, the flow rate depends on the number average particle size of the solid spherical colorant particles, the diameter of the dispensing outlet of the nozzle, and the angle of the cone-shaped inner wall of the first part of the supply container.

In an embodiment of the solid colorant dispensing unit according to the invention, the control assembly is configured to set a dispensing time interval in which the solenoid is switched from the inactive state to the active state and back to the inactive state to allow the nozzle to dispense a charge of solid spherical colorant particles taking into account at least the diameter of the dispensing outlet of the nozzle, the angle of the cone-shaped inner wall of the first part of the supply container, the current stock of solid spherical colorant particles in the supply container, and a response time of the solenoid in dependency on receiving a switching signal from the control assembly to switch between the inactive state and the active state.

In an embodiment of the solid colorant dispensing unit according to the invention, an overflow compartment is provided that is configured and arranged with respect to the dispensing outlet of the nozzle so as to receive solid spherical colorant particles dispensed by the nozzle as a result of a displacement of the spring-loaded plunger in response to switching the solenoid from the active state to the inactive state. The person skilled in the art will appreciate that the amount of solid spherical colorant particles received in the overflow compartment can also be taken into account regarding the required amount of solid spherical colorant particles that are to be dispensed. In this way, loss of solid spherical colorant particles can be minimized.

In addition, the person skilled in the art will appreciate that the overflow compartment prevents clogging of the dispensing outlet of the nozzle. Furthermore, to achieve accurate dosing, the amount of solid spherical colorant particles that end up in the overflow compartment needs to be taken into account when setting the dispensing time interval.

In an embodiment of the solid colorant dispensing unit according to the invention, a vibratory unit is provided that is configured and arranged to allow the supply container to vibrate at a frequency in a range of 0-55 Hz during operation of the solid colorant dispensing unit. The vibratory unit can be any device such as a vibratory motor that allows at least the first part of the supply container to vibrate during operation of the solid colorant dispensing unit. The person skilled in the art will appreciate that as a result of bridging of the solid spherical colorant particles near the dispensing outlet of the nozzle, the dispensing of the solid spherical colorant particles can be interrupted. By vibrating at least the first part of the supply container, bridging of the solid spherical colorant particles can be prevented. In addition, by vibrating at least the first part of the supply container an improved stacking in the supply container of the solid spherical colorant particles can be obtained as residual air between the particles can be removed.

In an embodiment of the solid colorant dispensing unit according to the invention, an exchangeable cartridge is provided comprising solid spherical colorant particles, the exchangeable cartridge being associated with the supply container so as to provide the supply container with a stock of solid spherical colorant particles and to allow automatic replenishment of said stock in the supply container with solid spherical colorant particles from the exchangeable cartridge, until it is empty, in response to dispensing at least one charge of solid spherical colorant particles via the nozzle.

The exchangeable cartridge is used to initially fill the supply container at least to a level above a predefined height above the transition between the second part and the first part of the supply container. Generally, the supply container is completely filled with solid spherical colorant particles from the exchangeable cartridge. In the case that the volume of the exchangeable cartridge is equal to the volume of the supply container, the exchangeable cartridge will be empty upon initial filling of the supply container and needs to be replaced by another exchangeable cartridge. In the case that the volume of the exchangeable cartridge is larger than the volume of the supply container, the solid spherical colorant particles that remain in the exchangeable cartridge after the initial filling of the supply container are inserted into the supply container, until the exchangeable cartridge is empty, every time a charge of solid spherical colorant particles is dispensed via the nozzle. In the case that the volume of the exchangeable cartridge is smaller than the volume of the supply container, it is important that the current stock of solid spherical colorant particles in the supply container can be replenished at least to a level above the predefined height above the transition between the second part and the first part of the supply container.

The person skilled in the art will appreciate that the nozzle can dispense the solid spherical colorant particles at a flow rate that is substantially constant until the stock of solid spherical colorant particles reaches the predefined height above the transition between the second part and the first part of the supply container. When the stock of solid spherical colorant particles falls below the predefined height above the transition between the second part and the first part of the supply container the flow rate starts decreasing. In that case, the detection unit provides a signal to the control assembly indicating that the current stock of solid spherical colorant particles needs to be replenished and that the empty exchangeable cartridge needs to be replaced.

In an embodiment of the solid colorant dispensing unit according to the invention, the number average particle size of the solid spherical colorant particles is in a range of 400-1400 μm, preferably in a range of 500-1300 μm, more preferably in a range of 600-1000 μm.

In an embodiment of the solid colorant dispensing unit according to the invention, the solid spherical colorant particles comprise 30-97 wt. % of a pigment, less than 5 wt. % of a solvent, and 3-40 wt. % surfactants, wherein wt. % is relative to the total weight of the solid spherical colorant particles.

In an embodiment of the solid colorant dispensing unit according to the invention, the dispensing outlet of the nozzle has a diameter in a range of 5-15 mm.

The person skilled in the art will appreciate that the diameter of the dispensing outlet of the nozzle will be chosen taking the average number particle size of the solid spherical colorant particles into account. For solid spherical colorant particles having a number average particle size in the range of 400-1400 μm, a dispensing outlet having a diameter that is smaller than 5 mm will become clogged too easily. However, if the dispensing outlet has a diameter that is larger than 15 mm for solid spherical colorant particles having a number average particle size in the abovementioned range, switching of the solenoid between the inactive state and the active state will be too critical as the switching will not be fast enough to prevent dispensing of too many solid spherical colorant particles. For solid spherical colorant particles having a number average particle size in the range of 400-1400 μm, the dispensing outlet of the nozzle preferably has a diameter of 8 mm.

In an embodiment of the solid colorant dispensing unit according to the invention, the spring-loaded plunger has a stroke in a range of 5-16 mm. In this way, when the solenoid is in the inactive state, the free end part of the spring-loaded plunger is positioned relative to the dispensing outlet of the nozzle to prevent, in use of the dispensing unit, dispensing of solid spherical colorant particles by blocking the dispensing outlet. As mentioned above, for solid spherical colorant particles having a number average particle size in the range of 400-1400 μm, the dispensing outlet of the nozzle prefer-ably has a diameter of 8 mm. In that case the free end part of the plunger preferably has a stroke of 8.2 mm.

According to another aspect of the present invention, a tinting machine is provided that is configured to tint a base paint composition with at least one charge of solid spherical colorant particles dispensed in a time-controlled way by at least one solid colorant dispensing unit according to the present invention. The tinting machine comprises:
- a receiving space that is configured and arranged to receive a paint container comprising said base paint composition that is to be tinted using said at least one charge of solid spherical colorant particles;
- a guideway that is configured and arranged to guide said at least one charge of solid spherical colorant particles dispensed by said at least one solid colorant dispensing unit into the paint container;
- a main control assembly that is configured and arranged to communicate with the control assembly of said at least one solid colorant dispensing unit in order to control dispensing of said at least one charge of solid spherical colorant particles by said at least one solid colorant dispensing unit.

The person skilled in the art will appreciate that as scales are not required in volumetric dosing, the tinting machine according to the present invention enables dispensing the at least one charge of solid spherical colorant particles directly into the paint container comprising the base paint composition that needs to be tinted. In this way, scales are no longer a limiting factor regarding the dimensions and/or the weight of the paint container.

According to an exemplary embodiment of the tinting machine according to the invention it comprises a plurality of solid colorant dispensing units according to the invention, wherein said plurality comprises at least two solid colorant dispensing units. In order to limit the foot print of the tinting machine, the person skilled in the art will appreciate that it is preferred to use a matrix arrangement for the plurality of solid colorant dispensing units. The main control assembly of the tinting machine is configured and arranged to communicate with each control assembly of the different solid colorant dispensing units of said plurality of dispensing units individually. As a result, the main control assembly can control the solid colorant dispensing units of said plurality of dispensing units to simultaneously or sequentially dispense charges of solid spherical colorant particles. The person skilled in the art will appreciate that tinting of a base paint composition using a tinting machine according to the present invention can be done much faster than using a tinting machine based on gravimetric dosing.

BRIEF DESCRIPTION OF THE DRAWINGS

Further features and advantages of the invention will become apparent from the description of the invention by way of exemplary and non-limiting embodiments of a solid colorant dispensing unit and a tinting machine comprising such a dispensing unit.

The person skilled in the art will appreciate that the described embodiments of the solid colorant dispensing unit and the tinting machine are exemplary in nature only and not to be construed as limiting the scope of protection in any way. The person skilled in the art will realize that alternatives and equivalent embodiments of the solid colorant dispensing unit and the tinting machine can be conceived and reduced to practice without departing from the scope of protection of the present invention.

Reference will be made to the figures on the accompanying drawing sheets. The figures are schematic in nature and therefore not necessarily drawn to scale. Furthermore, equal reference numerals denote equal or similar parts. On the attached drawing sheets.

DETAILED DESCRIPTION OF EMBODIMENTS

Figure 1:
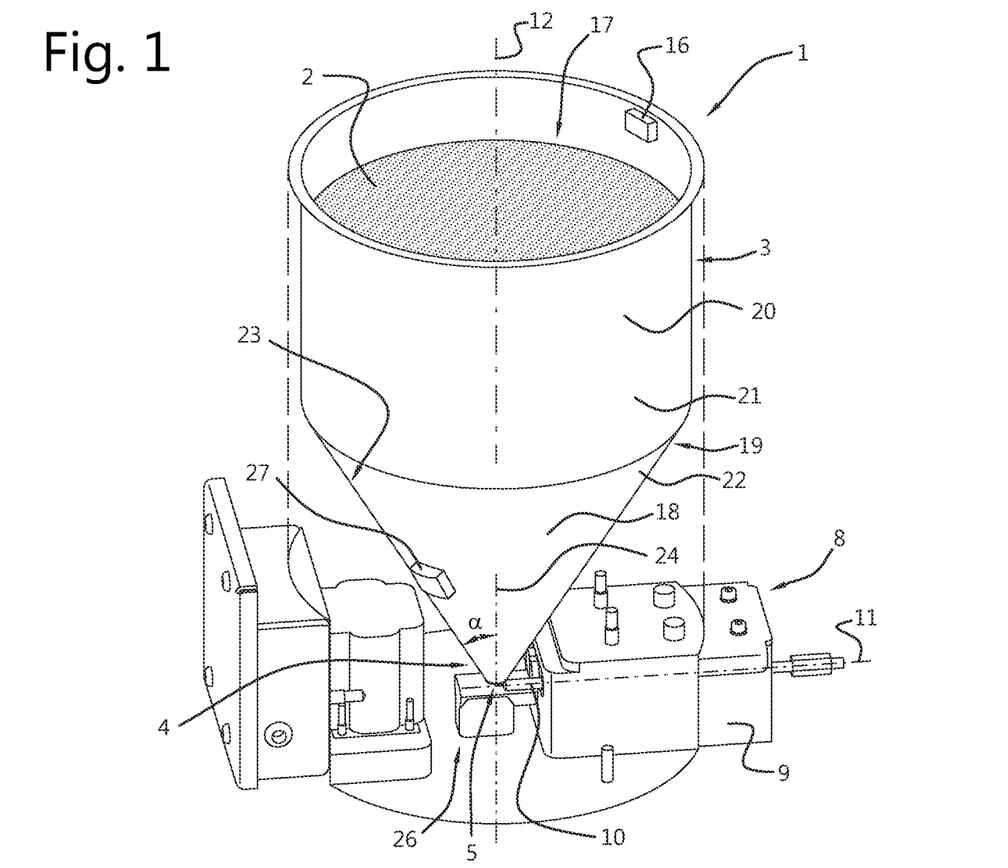
FIG. 1 shows a schematic perspective view of an exemplary, non-limiting embodiment of a solid colorant dispensing unit according to the present invention.

FIG. 1 shows a schematic perspective view of an exemplary, non-limiting embodiment of a solid colorant dispensing unit 1 according to the present invention that is configured to dispense at least one charge of solid spherical colorant particles 2 in a time-controlled way. The solid colorant dispensing unit 1 comprises a supply container 3 that has a free end portion 4 that is provided with a nozzle 5 that is configured and arranged to dispense said at least one charge of solid spherical colorant particles 2 during operation of the solid colorant dispensing unit 1. The solid spherical colorant particles 2 have a number average particle size and a number particle size distribution that enable volumetric dosing of the solid spherical colorant particles 2. A ratio of the standard deviation of the number particle size distribution to the number average particle size of the solid spherical colorant particles 2 is less than 25%, preferably less than 22% and more preferably less than 20%. The person skilled in the art will appreciate that as a result of the well-defined shape and the narrow number particle size distribution of the solid spherical colorant particles 2, which are also referred to as pearls, the solid spherical colorant particles 2 can be dispensed at a predictable and well-controllable flow rate. The number particle size distribution is determined with light scattering with fully automated image analysis according to ISO 13322-1:2004, Particle size analysis—image analysis methods—Part 1: Static image analysis methods by the use of the OCCHIO ZEPHYR ESR analyzer.

The number average particle size of the solid spherical colorant particles 2 is in a range of 400-1400 μm, preferably in a range of 500-1300 μm, more preferably in a range of 600-1000 μm. The solid spherical colorant particles 2 comprise 30-97 wt. % of a pigment, less than 5 wt. % of a solvent, and 3-40 wt. % surfactants, wherein wt % is relative to the total weight of the solid spherical colorant particles 2.

Figure 2:
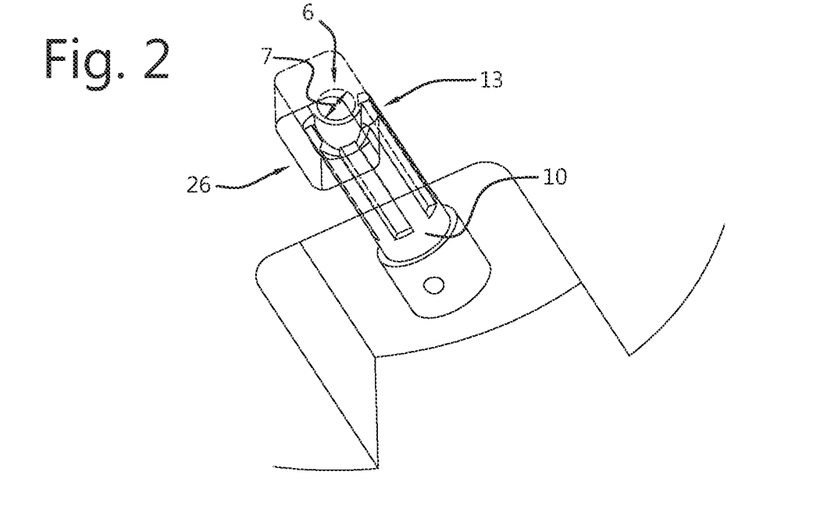
FIG. 2 shows an enlarged view of the spring-loaded plunger, the dispensing outlet of the nozzle and the overflow compartment of the solid colorant dispensing unit shown in FIG. 1.
Figure 3:
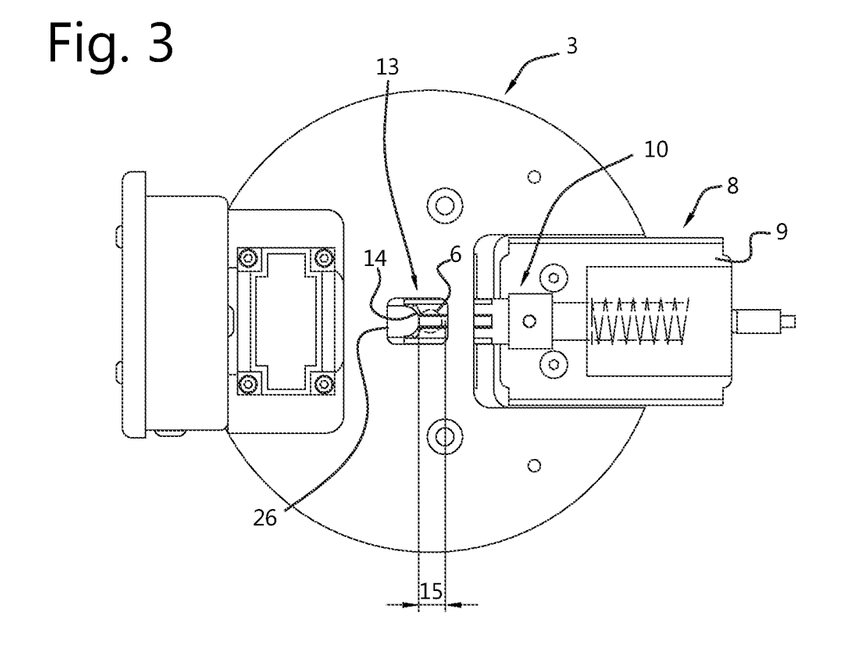
FIG. 3 shows a schematic bottom view of the solid colorant dispensing unit shown in FIG. 1 when the solenoid is in the inactive state and the spring-loaded plunger is arranged with respect to the dispensing outlet of the nozzle of the supply container to prevent dispensing of solid spherical colorant particles.

The nozzle 5 of the supply container 3 of the solid colorant dispensing unit 1 shown in FIG. 1 further comprises a dispensing outlet 6 as shown in more detail in FIGS. 2, 3A and 3B. The dispensing outlet 6 has a diameter 7 taking into account the number average particle size of the solid spherical colorant particles 2. FIG. 2 also shows an enlarged view of an overflow compartment 26 of the solid colorant dispensing unit 1 shown in FIG. 1.

The solid colorant dispensing unit 1 shown in FIG. 1 further comprises a control assembly 8 that is configured and arranged to control dispensing of said at least one charge of solid spherical colorant particles 2 in a time-controlled way by taking into account said well-defined properties of the solid spherical colorant particles 2, especially shape and narrow number particle size distribution, and the diameter 7 of the dispensing outlet 6 of the nozzle 5.

The control assembly 8 of the solid colorant dispensing unit 1 according to the exemplary, non-limiting embodiment thereof shown in FIG. 1, comprises a solenoid 9 that comprise a spring-loaded plunger 10. When the solenoid 9 is in an inactive state, i.e. when no electrical bias is supplied to the solenoid, the spring-loaded plunger 10 is arranged with respect to the dispensing outlet 6 of the nozzle 5 so as to prevent the nozzle 5 from dispensing solid spherical colorant particles 2. This is shown in more detail in FIG. 3. Whereas, when the solenoid 9 is in an active state, i.e. when an electrical bias is supplied to the solenoid, the spring-loaded plunger 10 is arranged with respect to the dispensing outlet 6 of the nozzle 5 so as to allow the nozzle 5 to dispense solid spherical colorant particles 2. This is shown in more detail in FIG. 4.

The person skilled in the art will appreciate that by using a solenoid 9 that comprises a spring-loaded plunger 10 it is possible to accurately dispense even very small charges of solid spherical colorant particles in a time-controlled way. In this way the solid colorant dispensing unit 1 according to the present invention has dosing capabilities that are at least the same as dosing capabilities achievable by prior art solid colorant dispensing units. However, the solid colorant dispensing unit 1 according to the present invention allows volumetric dosing which has the abovementioned advantages over the generally used gravimetric dosing techniques.

According to the exemplary non-limiting embodiment of the solid colorant dispensing unit 1 shown in FIG. 1, the spring-loaded plunger 10 of the solenoid 9 is arranged such that its longitudinal centerline 11 is directed transverse to the longitudinal centerline 12 of the nozzle 5. The person skilled in the art will appreciate that in this way the spring-loaded plunger 10 enables very fast and accurate control regarding opening and closing of the dispensing outlet 6 of the nozzle 5 and therefore of the dispensed charges of solid spherical colorant particles 2.

The exemplary non-limiting embodiment of the solid colorant dispensing unit 1 shown in FIG. 1 comprises a vibratory unit 27, e.g. a vibratory motor or any other suitable device, that is configured and arranged to allow the supply container 3 to vibrate at a frequency in a range of 0-55 Hz during operation of the solid colorant dispensing unit 1. The person skilled in the art will appreciate that by vibrating the supply container so-called bridging of the solid spherical colorant particles 2 near the dispensing outlet 6 of the nozzle 5, which can interrupt the dispensing of the solid spherical colorant particles 2, can be prevented. In addition, by vibrating the supply container 3 an improved stacking in the supply container 3 of the solid spherical colorant particles 2 can be obtained as residual air between the particles can be removed.

The exemplary non-limiting embodiment of the solid colorant dispensing unit 1 shown in FIG. 1 furthermore comprises a detection unit 16 that is configured and arranged to determine a current stock 17 of solid spherical colorant particles 2 in the supply container 3 and to provide the control assembly 8 with a detection signal corresponding to the determined current stock 17. The person skilled in the art will appreciate that the detection unit 16 can be operatively connected with the control assembly 8 using for example at least one of an electrical connection and an optical connection. Said connection can be established in at least one of a wired and wireless way. The detection unit 16 enables timely detection of when the stock 17 of solid spherical colorant particles 2 in the container 3 needs to be replenished. Hence, unnecessary down-time due to a shortage of solid spherical colorant particles 2 can be avoided.

In the exemplary non-limiting embodiment of the solid colorant dispensing unit 1 shown in FIG. 1 the supply container 3 comprises a first part 18 having the free end portion 4 that is provided with the nozzle 5 and a second part 20 having an end portion 21 that is connected in open communication with an end portion 22 of the first part 18 that is arranged opposite the nozzle 5 thereby providing a transition 19 between the second part 20 and the first part 18. The first part 18 has a cone-shaped inner wall 23 that with respect to its longitudinal centerline 24 is arranged at an angle α in a range of 15-55 degrees, preferably being equal to 30 degrees. As a result of the cone-shaped inner wall 23 all solid spherical colorant particles 2 are guided towards the dispensing outlet 6 of the nozzle 5. The person skilled in the art will appreciate that the nozzle 5 dispenses the solid spherical colorant particles 2 at a flow rate that depends on the height and therefore on the amount of solid spherical colorant particles 2 of the current stock 17 of solid spherical colorant particles 2 that is present above the transition 19 between the second part 20 and the first part 18 of the supply container 3. In addition, the flow rate depends on the number average particle size of the solid spherical colorant particles 2, the diameter 7 of the dispensing outlet 6 of the nozzle 5, and the angle α of the cone-shaped inner wall 23 of the first part 18 of the supply container 3. The supply container 3 has a total height that typically is in a range of 40-600 mm, preferably 223 mm.

It is noted that the control assembly 8 is configured to set a dispensing time interval in which the solenoid 9 is switched from the inactive state to the active state and back to the inactive state to allow the nozzle 5 to dispense a charge of solid spherical colorant particles 2 taking into account at least the diameter 7 of the dispensing outlet 6 of the nozzle 5, the angle α of the cone-shaped inner wall 23 of the first part 18 of the supply container 3, the current stock 17 of solid spherical colorant particles 2 in the supply container 3, and a response time of the solenoid 9 in dependency on receiving a switching signal from the control assembly 8 to switch between the inactive state and the active state. A typical dispensing time interval for the solid colorant dispensing unit 1 according to the present invention is in a range of 5-100 ms.

The person skilled in the art will appreciate that by applying an electrical bias to the solenoid 9 during a set dispensing time interval the solenoid 9 is switched from the inactive state to the active state. In the active state the spring-loaded plunger 10 is retracted. As a result thereof, the nozzle 5 can dispense solid spherical colorant particles 2 as the dispensing outlet 6 of the nozzle is at most partially blocked by the spring-loaded plunger 10. The person skilled in the art will appreciate that it is preferred that the dispensing outlet 6 of the nozzle 5 is not blocked at all by the spring-loaded plunger 10 while the solenoid 9 is in the active state. At the end of the dispensing time interval the solenoid 9 is switched from the active state back to the inactive state. As a result thereof, the spring-loaded plunger 10 is displaced by the spring that is associated with the plunger thereby blocking the dispensing outlet 6 of the nozzle 5 so as to prevent the nozzle 5 from dispensing solid spherical colorant particles 2.

FIG. 2 shows an enlarged view of the spring-loaded plunger 10, the dispensing outlet 6 of the nozzle and the overflow compartment 26 of the solid colorant dispensing unit 1 shown in FIG. 1. FIG. 2 provides a better view on the arrangement of these elements with respect to each other. The overflow compartment 26 is configured and arranged with respect to the dispensing outlet 6 of the nozzle so as to receive solid spherical colorant particles 2 dispensed by the nozzle as a result of a displacement of the spring-loaded plunger 10 so as to block the dispensing outlet 6 of the nozzle in response to switching the solenoid from the active state to the inactive state. The person skilled in the art will appreciate that the amount of solid spherical colorant particles 2 received in the overflow compartment 26 can also be taken into account regarding the required amount of solid spherical colorant particles 2 that are to be dispensed. The solid spherical colorant particles 2 that are received in the overflow compartment 26 are also guided into a paint container that comprises a base paint composition that needs to be tinted. In this way, unnecessary loss of solid spherical colorant particles 2 can be minimized.

The person skilled in the art will appreciate that the diameter 7 of the dispensing outlet 6 of the nozzle will be chosen taking the average number particle size of the solid spherical colorant particles 2 into account. For solid spherical colorant particles 2 having a number average particle size in the range of 400-1400 μm, a dispensing outlet 6 having a diameter 7 that is smaller than 5 mm will become clogged too easily. However, if the dispensing outlet 6 has a diameter 7 that is larger than 15 mm for solid spherical colorant particles 2 having a number average particle size in the abovementioned range, switching of the solenoid 9 between the inactive state and the active state will be too critical as the switching will not be fast enough to prevent dispensing of too many solid spherical colorant particles 2. For solid spherical colorant particles 2 having a number average particle size in the range of 400-1400 µm, the dispensing outlet 6 of the nozzle has a diameter 7 in a range of 5-15 mm, preferably 8 mm.

FIG. 2 shows that the spring-loaded plunger 10 is provided with elongated recesses. As a result, mechanical friction can be reduced and a faster displacement of the spring-loaded plunger 10 can be achieved. Hence, dispensing time intervals near the lower boundary of the abovementioned range of 5-100 ms can be achieved.

Although not shown, the side of the spring-loaded plunger that is arranged to face the dispensing outlet of the nozzle preferably has a flat surface. In this way, a constant and uniform flow of solid spherical colorant particles out of the nozzle can be achieved upon displacement of the spring-loaded plunger by the solenoid.

FIG. 3 shows a schematic bottom view of the solid colorant dispensing unit 1 shown in FIG. 1 when the solenoid 9 is in the inactive state and the spring-loaded plunger 10 is arranged with respect to the dispensing outlet 6 of the nozzle of the supply container 3 to prevent dispensing of solid spherical colorant particles 2.

Figure 4:
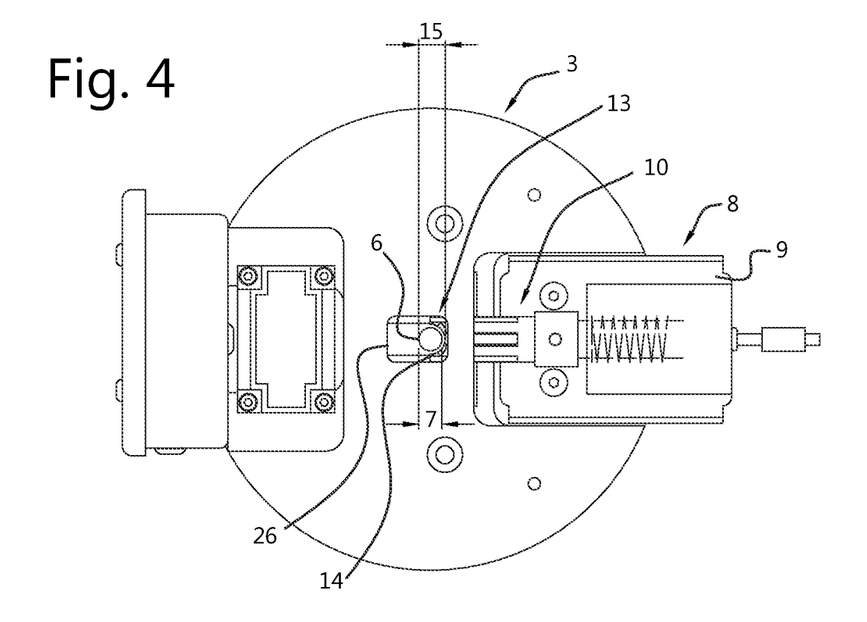
FIG. 4 shows a schematic bottom view of the solid colorant dispensing unit shown in FIG. 1 when the solenoid is in the active state and the spring-loaded plunger is arranged with respect to the dispensing outlet of the nozzle of the supply container to allow dispensing a charge of solid spherical colorant particles.

FIG. 4 shows a schematic bottom view of the solid colorant dispensing unit 1 shown in FIG. 1 when the solenoid 9 is in the active state and the spring-loaded plunger 10 is arranged with respect to the dispensing outlet 6 of the nozzle of the supply container 3 to allow dispensing a charge of solid spherical colorant particles 2.

As can be seen from FIGS. 2, 3 and 4 the spring-loaded plunger 10 has a free end part 13 that, as explained above, is arrangeable with respect to the dispensing outlet 6 of the nozzle 5 so as to control dispensing of the solid spherical colorant particles 2. FIGS. 2, 3 and 4 show an exemplary embodiment of the free end part 13 of the spring-loaded plunger 10. In accordance with this embodiment the free end part 13 has an outer circumference 14 that has a shape that is configured to ensure a uniform flow of dispensed solid spherical colorant particles 2 when the free end part 13 partially blocks the dispensing outlet 6. The person skilled in the art will appreciate that when the flow of dispensed solid spherical colorant particles 2 is disturbed by the free end part 13 of the spring-loaded plunger 10 this will adversely affect the dosing accuracy. The flow of dispensed solid spherical colorant particles can be disturbed if the outer circumference 14 has a shape providing sharp edges behind which the solid spherical colorant particles 2 can get hooked. By providing the free end part 13 of the spring-loaded plunger 10 with an outer circumference having a shape that prevents the solid spherical colorant particles to get hooked behind its edges when flowing out of the dispensing outlet 6 of the nozzle as long as it is partially blocked by the free end part 13, a uniform flow of dispensed particles can be ensured. As a result, a high dispensing accuracy can be achieved.

In accordance with the embodiment of the free end part 13 of the spring-loaded plunger 10 the outer circumference of the free end part 13 has a semi-circular shape. The person skilled in the art will appreciate that the outer circumference 14 of the free end part 13 of the spring-loaded plunger 10 may have any polygonal shape that enables a uniform flow of dispensed solid spherical colorant particles 2.

Comparison of the positions of the free end part of the spring-loaded plunger 10 as shown in FIGS. 3 and 4, respectively shows that the spring-loaded plunger 10 has a stroke 15. In accordance with the embodiment of the solid colorant dispensing unit shown in FIGS. 1-4, the stroke 15 of the spring-loaded plunger 10 typically is in a range of 5-16 mm. The stroke 15 of the spring-loaded plunger 10 must enable that, when the solenoid 9 is in the inactive state, the free end part 13 of the spring-loaded plunger 10 is positioned relative to the dispensing outlet 6 of the nozzle to prevent dispensing of solid spherical colorant particles 2 by blocking the dispensing outlet 6. Whereas, when the solenoid 9 is in the active state, the stroke must be sufficient to displace the free end part 13 of the spring-loaded plunger 10 with respect to the dispensing outlet 6 of the nozzle to allow a uniform flow of solid spherical colorant particles 2 to be dispensed by the nozzle. As mentioned above, for solid spherical colorant particles 2 having a number average particle size in the range of 400-1400 µm, the dispensing outlet 6 of the nozzle preferably has a diameter 7 of 8 mm. In that case the free end part 13 of the spring-loaded plunger 10 preferably has a stroke of 8.2 mm.

Figure 5A:
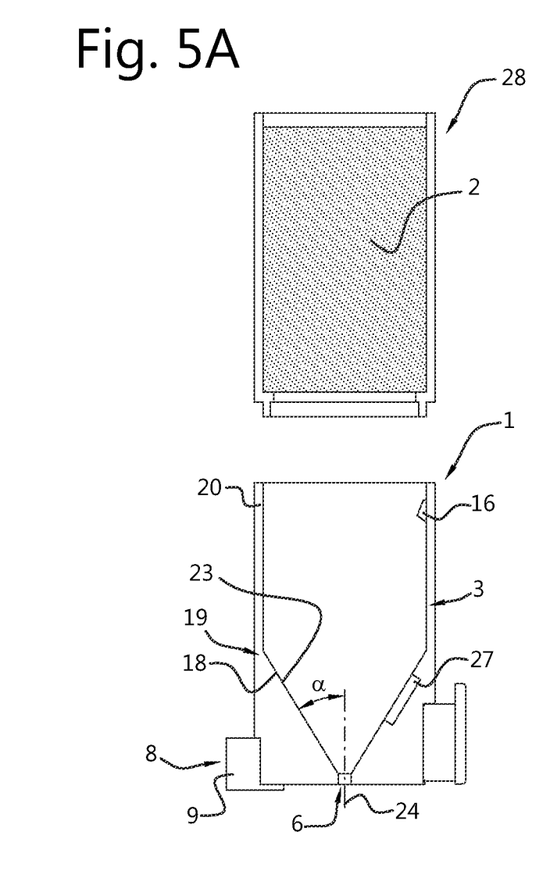
FIG. 5A shows a schematic side view of a solid colorant dispensing unit according to the embodiment shown in FIG. 1 having an empty supply container on top of which a first exchangeable cartridge is placed to fill the supply container with solid spherical colorant particles.
Figure 5B:
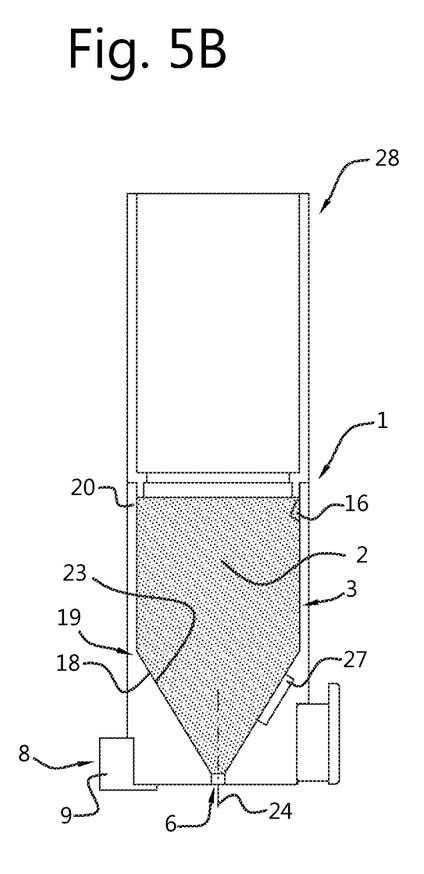
FIG. 5B schematically shows the situation in which the supply container of the solid colorant dispensing unit shown in FIG. 5A is completely filled with solid spherical colorant particles and the first exchangeable cartridge is empty.
Figure 5C:
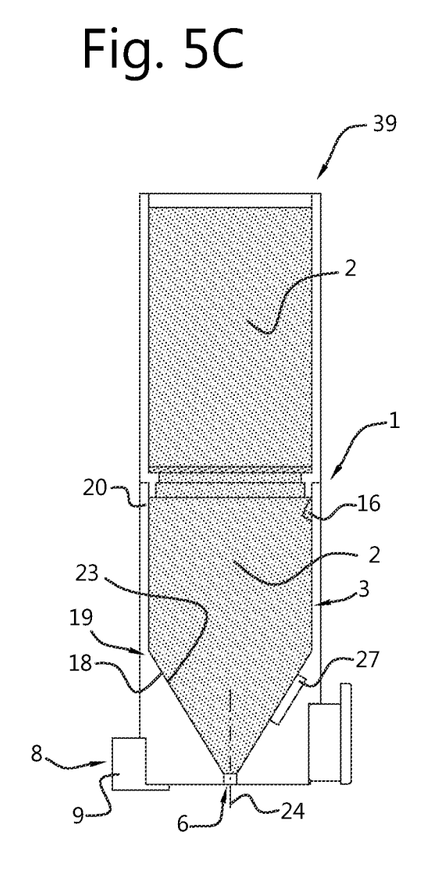
FIG. 5C schematically shows the situation in which the supply container of the solid colorant dispensing unit shown in FIG. 5B is completely filled with solid spherical colorant particles from the first exchangeable cartridge and the first exchangeable cartridge has been replaced by a second exchangeable cartridge that is completely filled with solid spherical colorant particles.
Figure 5D:
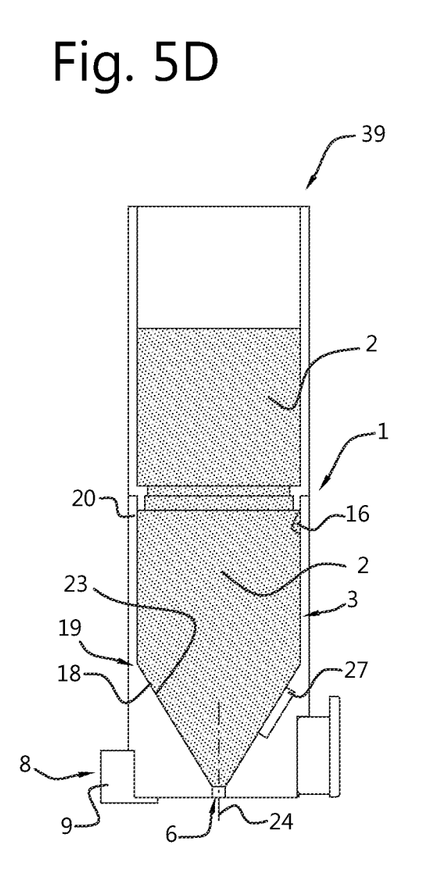
FIG. 5D schematically shows the situation in which the supply container of the solid colorant dispensing unit shown in FIG. 5C is completely filled with solid spherical colorant particles and the second exchangeable cartridge comprises remaining solid spherical colorant particles 2.

FIG. 5A shows a schematic side view of a solid colorant dispensing unit 1 according to the embodiment shown in FIG. 1 having an empty supply container 3 on top of which a first exchangeable cartridge 28 is placed to fill the supply container 3 with solid spherical colorant particles 2. The person skilled in the art will appreciate that the first exchangeable cartridge 28 can be used to initially fill the supply container 3 at least to a level above a predefined height 35 above the transition 19 between the first part 18 and the second part 20 of the supply container 3. Generally, the supply container 3 is completely filled with solid spherical colorant particles 2 from the first exchangeable cartridge 28 that then is empty as shown in FIG. 5B. FIG. 5C schematically shows the situation in which the supply container 3 of the solid colorant dispensing unit 1 shown in FIG. 5B is completely filled with solid spherical colorant particles from the first exchangeable cartridge 28 that has been replaced by a second exchangeable cartridge 39 that is completely filled with solid spherical colorant particles. The second exchangeable cartridge 39 is configured to allow automatic replenishment of the stock of solid spherical colorant particles 2 in the supply container 3 with solid spherical colorant particles 2 from the second exchangeable cartridge 39, until it is empty, every time a charge of solid spherical colorant particles 2 is dispensed via the dispending outlet 6 of the nozzle. FIG. 5D schematically shows the situation in which the supply container 3 of the solid colorant dispensing unit 1 shown in FIG. 5C is completely filled with solid spherical colorant particles 2 and the second exchangeable cartridge 39 comprises remaining solid spherical colorant particles 2.

Figure 5E:
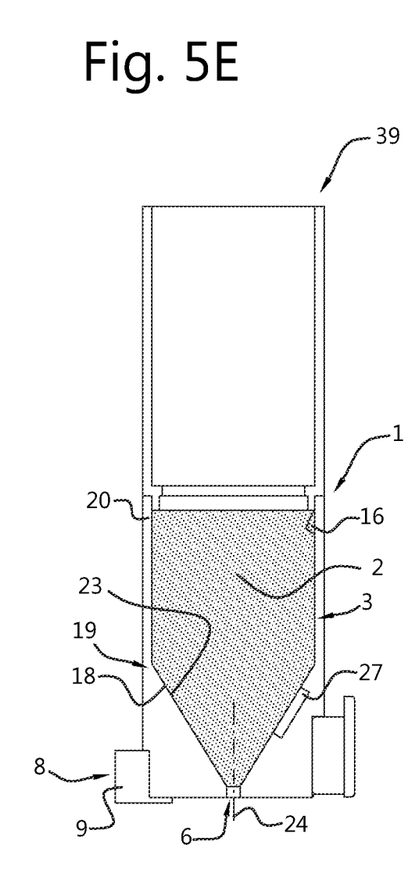
FIG. 5E schematically shows the situation in which the second exchangeable cartridge is empty and the supply container of the solid colorant dispensing unit is still completely filled.

FIG. 5E schematically shows the situation in which the second exchangeable cartridge 39 is empty and the supply container 3 of the solid colorant dispensing unit 1 is still completely filled. The person skilled in the art will appreciate that the solid spherical colorant particles 2 can be dispensed at a flow rate that decreases in a substantially linear way with the decreasing height of the stock of solid spherical colorant particles 2 until the stock of solid spherical colorant particles reaches the transition 19 between the first part 18 and the second part 20 of the supply container 3. For a supply container 3 that comprises solid spherical colorant particles 2 having a number average particle size in a range of 400-1400 µm up to a predefined height 35 above the transition 19 between the first part 18 and the second part 20 of the supply container 3 (see FIG. 5F) and that has a nozzle with a dispensing outlet 6 having a diameter of 8 mm, and that has a first part 18 having a cone-shaped inner wall 23 at an angle α of 30 degrees with respect to its longitudinal centerline 24, the solid spherical colorant particles 2 can be dispensed at a flow rate in a range of 200-400 ml/min. The solid spherical colorant particles 2 can be dispensed as a constant and homogeneous flow due to the well-defined properties of the solid spherical colorant particles 2. This enables a very accurate volumetric dosing even of small charges of solid spherical colorant particles 2.

Figure 5F:
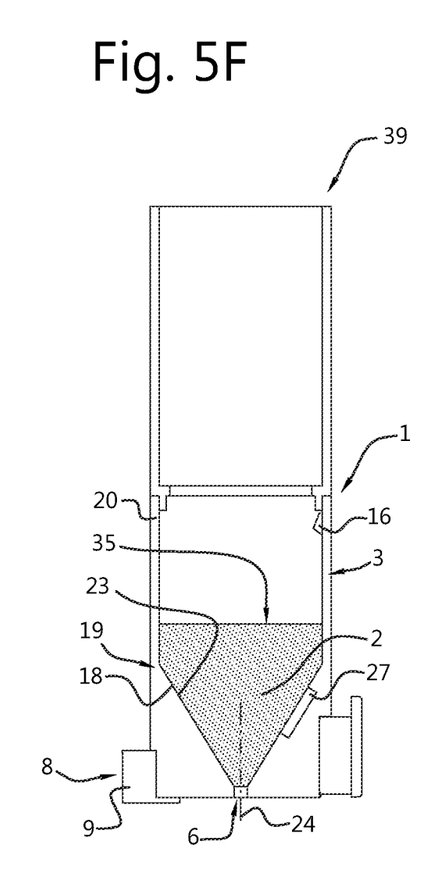
FIG. 5F schematically shows the situation in which the second exchangeable cartridge is completely empty and the current stock of solid spherical colorant particles in the supply container is at a predefined height above a transition between the first part and the second part of the supply container of the solid colorant dispensing unit.

FIG. 5F schematically shows the situation in which the second exchangeable cartridge 39 is completely empty and the current stock of solid spherical colorant particles 2 in the supply container 3 is at the abovementioned predefined height 35 above the transition 19 between the first part 18 and the second part 20 of the supply container 3 of the solid colorant dispensing unit 1. The person skilled in the art will appreciated that if the stock of solid spherical colorant particles 2 falls below the predefined height 35 above the transition 19 between the first part 18 and the second part 20 of the supply container 3 the flow rate becomes too low. The detection unit 16 should provide a signal to the control assembly 8 indicating that the current stock of solid spherical colorant particles 2 in the supply container 3 has reached the predefined height 35 above the transition 19 between the first part 18 and the second part 20 of the supply container 3 and therefore needs to be replenished. This can be done by replacing the empty second exchangeable cartridge 39 by a third exchangeable cartridge (not shown) that is filled at least with sufficient solid spherical colorant particles 2 to bring the current stock of solid spherical colorant particles 2 in the supply container 3 above the predefined height 35 above the transition 19 between the first part 18 and the second part 20 of the supply container 3. Generally, the third exchangeable cartridge will be completely filled with solid spherical colorant particles of the desired kind.

Although not explicitly shown in the figures, the person skilled in the art will appreciate that it is also possible to apply exchangeable cartridges that have a larger volume than the volume of the supply container of the solid colorant dispensing unit according to the invention. In that case, after initial filling of the supply container with solid spherical colorant particles from a first exchangeable cartridge, solid spherical colorant particles will remain in the first exchangeable cartridge. The first exchangeable cartridge can be configured to allow automatic replenishment of the stock of solid spherical colorant particles in the supply container with remaining solid spherical colorant particles from the first exchangeable cartridge, until it is empty, every time a charge of solid spherical colorant particles is dispensed via the dispending outlet of the nozzle. In fact, the situations as described in relation to FIGS. 5D-5F regarding the replenishment of solid spherical colorant particles in the supply container and replacement of the first exchangeable cartridge once it is empty and the current stock of solid spherical colorant particles in the supply container has reached the predefined height above the transition between the first part and the second part of the supply container, apply in an analogous way.

Furthermore, the person skilled in the art will appreciate that in the case that exchangeable cartridges are used that have a volume that is smaller than the volume of the supply container, it is important that the current stock of solid spherical colorant particles in the supply container can be replenished at least to a level above the predefined height above the transition between the second part and the first part of the supply container.

Figure 6:
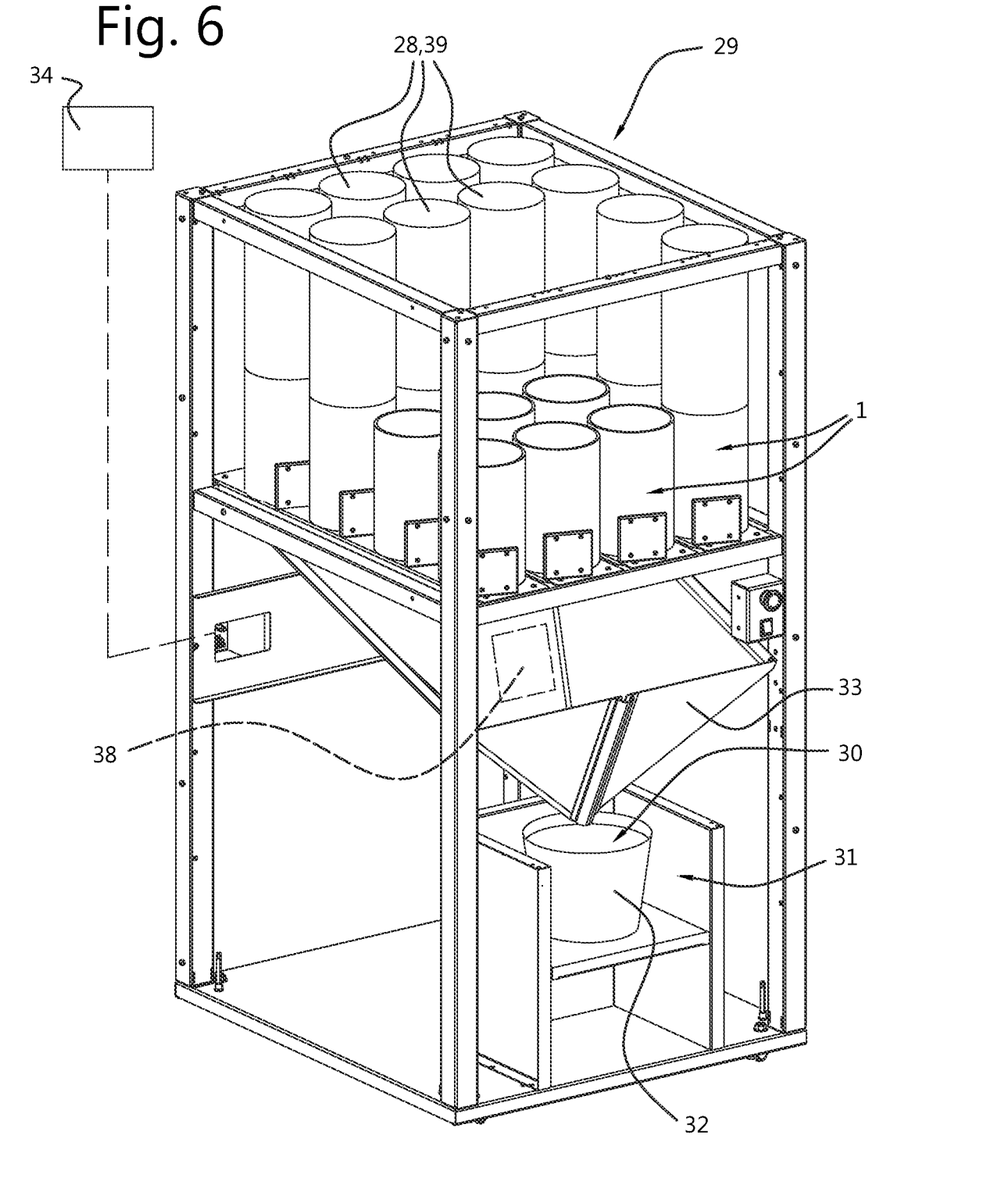
FIG. 6 shows a schematic perspective view of an exemplary, non-limiting embodiment of a tinting machine according to the present invention.

FIG. 6 shows a schematic perspective view of an exemplary, non-limiting embodiment of a tinting machine 29 according to the present invention. The tinting machine 29 is configured to tint a base paint composition 30 with at least one charge of solid spherical colorant particles 2 dispensed in a time-controlled way by at least one solid colorant dispensing unit 1 according to the present invention. In accordance with the exemplary embodiment shown in FIG. 6, the tinting machine 29 comprises a matrix of sixteen solid colorant dispensing units 1 according to the invention. The person skilled in the art will appreciate that any suitable number of solid colorant dispensing units 1 can be used depending on the required specification of the tinting machine. In principle all dispensing units can be provided with an exchangeable cartridge 28, 39 comprising a specific kind of solid spherical colorant particles 2 having the abovementioned well-defined properties. However, it is also possible to provide only a subset of the solid colorant dispensing units 1 of the matrix of solid colorant dispensing units 1 with an exchangeable cartridge 28, 39 and leave the remaining solid colorant dispensing units 1 unemployed. In accordance with the exemplary, non-limiting embodiment of the tinting machine 29 shown in FIG. 6, ten of the sixteen solid colorant dispensing units 1 have been provided with an exchangeable cartridge 28, 39. The person skilled in the art will appreciate that a matrix arrangement of the solid colorant dispensing units 1 is particularly advantageous for limiting the foot print of the tinting machine 29.

Furthermore, the tinting machine 29 shown in FIG. 6 comprises a receiving space 31 that is configured and arranged to receive a paint container 32 comprising said base paint composition 30 that is to be tinted using at least one charge of solid spherical colorant particles 2. The tinting machine 29 also comprises a guideway 33 that is configured and arranged to guide said at least one charge of solid spherical colorant particles 2 dispensed by said at least one solid colorant dispensing unit 1 into the paint container 32.

The tinting machine 29 shown in FIG. 6 also comprises a main control assembly 34 that is configured and arranged to communicate with each control assembly of the ten solid colorant dispensing units 1 that are employed. As a result, the main control assembly 34 can control the control assemblies of each of the ten solid colorant dispensing units 1 of the exemplary matrix of sixteen dispensing units 1 to simultaneously or sequentially dispense charges of solid spherical colorant particles 2. The person skilled in the art will appreciate that tinting of a base paint composition 30 using a tinting machine 29 according to the present invention can be done much faster than using a tinting machine based on gravimetric dosing as the at least one charge of solid spherical colorant particles 2 can be dispensed directly into the paint container 32 comprising the base paint composition 30 that needs to be tinted.

The person skilled in the art will appreciate that said connection between the main control assembly 34 and any one of the control assemblies of the ten solid colorant dispensing units 1 can be established in at least one of a wired and wireless way.

FIG. 6 shows that the exemplary embodiment of the tinting machine 29 is also provided with a vibratory system 38 that is configured and arranged to allow the guideway 33 to vibrate in order to enhance the guidance of the solid spherical colorant particles towards the paint container 32.

The vibratory system may enable the guideway 33 to vibrate at a frequency in a range of 0-55 Hz.

Furthermore, it is noted that the guidance of the solid spherical colorant particles towards the paint container 32 can further be improved by providing inner walls of at least one of the supply container of the solid colorant dispensing unit and the guideway that are in direct contact with the solid spherical colorant particles that comprise aluminum or a polymer blend suitable for injection molding. Said inner walls are configured to be anti-electrostatic, wear-resistant, hydrophobic and have a surface roughness (Ra) of at most 0.3 µm.

The present invention can be summarized as relating to a solid colorant dispensing unit 1 for dispensing charges of solid spherical colorant particles 2 in a time-controlled way, said dispensing unit comprising a supply container 3 having a nozzle 5 for dispensing said particles having a number average particle size and a number particle size distribution, wherein a ratio of the standard deviation of the number particle size distribution to the number average particle size of said particles is less than 25%. The nozzle comprising a dispensing outlet 6 having a diameter 7 taking into account the number average particle size of said particles. Said dispensing unit comprising a control assembly 8 for controlling the dispensing of said charges of said particles by taking into account said properties of said particles and the diameter of the outlet of the nozzle. The invention also relates to a tinting machine 29 comprising said solid colorant dispensing unit.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

REFERENCE NUMERALS 1 solid colorant dispensing unit
2 solid spherical colorant particles
3 supply container
4 free end portion of the supply container
5 nozzle
6 dispensing outlet of the nozzle
7 diameter of the dispensing outlet
8 control assembly
9 solenoid
10 spring-loaded plunger
11 longitudinal centerline of the spring-loaded plunger
12 longitudinal centerline of the nozzle
13 free end part of the spring-loaded plunger
14 outer circumference of the free end part of the spring-loaded plunger
15 stroke of the spring-loaded plunger
16 detection unit
17 current stock of solid spherical colorant particles
18 first part of the supply container
19 transition between the first part and the second part of the supply container
20 second part of the supply container
21 free end portion of the second part of the supply container
22 end portion of the first part of the supply container that is arranged opposite the nozzle
23 cone-shaped inner wall of the first part of the supply container
24 longitudinal centerline of the first part of the supply container
α angle at which the cone-shaped inner wall of the first part of the supply container is arranged with respect to its longitudinal centerline
26 overflow compartment
27 vibratory unit
28 first exchangeable cartridge
29 tinting machine
30 base paint composition
31 receiving space
32 paint container
33 guideway
34 main control assembly
35 predefined height above the transition between the first part and the second part of the supply container
β angle between bottom of the guideway and a centerline of the paint container that is directed transverse to a longitudinal centerline of the paint container
36 longitudinal centerline of the paint container
37 centerline of the paint container that is directed transverse to the longitudinal centerline of the paint container
38 vibratory system for the guideway of the tinting machine
39 second exchangeable cartridge

What is claimed is:

1. A solid colorant dispensing unit configured to dispense at least one charge of solid spherical colorant particles in a time-controlled way, the solid colorant dispensing unit comprising:

a supply container comprising a free end portion that is provided with a nozzle that is configured and arranged to dispense said at least one charge of solid spherical colorant particles during operation of the solid colorant dispensing unit, said solid spherical colorant particles having the following properties:
a number average particle size; and
a number particle size distribution, wherein a ratio of the standard deviation of the number particle size distribution to the number average particle size of the solid spherical colorant particles is less than 25%, wherein the number particle size distribution is determined with light scattering with fully automated image analysis according to ISO 13322-1: 2004, Particle size analysis—Image analysis methods—Part 1: Static image analysis methods by the use of an OCCHIO ZEPHYR ESR analyzer;

the nozzle comprising a dispensing outlet having a diameter taking into account the number average particle size of the solid spherical colorant particles; and wherein the solid colorant dispensing unit comprises:
a solenoid comprising a plunger that dispenses said at least one charge of solid spherical colorant particles by opening and closing the dispensing outlet of the nozzle for a dispensing time interval taking into account said properties of said solid spherical colorant particles and the diameter of the dispensing outlet of the nozzle to enable volumetric dosing of the solid spherical colorant particles.

2. The solid colorant dispensing unit according to claim 1, wherein a vibratory unit is provided that is configured and arranged to allow the supply container to vibrate at a frequency in a range of 0-55 Hz during operation of the solid colorant dispensing unit.

3. The solid colorant dispensing unit according to claim 1, wherein an exchangeable cartridge is provided comprising solid spherical colorant particles, the exchangeable cartridge being associated with the supply container so as to provide the supply container with a stock of solid spherical colorant particles and to allow automatic replenishment of said stock in the supply container with solid spherical colorant particles from the exchangeable cartridge, until the exchangeable cartridge is empty, in response to dispensing at least one charge of solid spherical colorant particles via the nozzle.

4. The solid colorant dispensing unit according to claim 1, wherein the solid spherical colorant particles comprise 30-97 wt. % of a pigment, less than 5 wt. % of a solvent, and 3-40 wt. % surfactants, wherein wt. % is relative to the total weight of the solid spherical colorant particles.

5. The solid colorant dispensing unit according to claim 1, wherein the dispensing outlet of the nozzle has a diameter in a range of 5-15 mm.

6. A tinting machine having at least one solid colorant dispensing unit according to claim 1, the tinting machine being configured to tint a base paint composition with at least one charge of solid spherical colorant particles dispensed in a time-controlled way by the at least one solid colorant dispensing unit, the tinting machine further comprising:
a receiving space that is configured and arranged to receive a paint container comprising said base paint composition that is to be tinted using said at least one charge of solid spherical colorant particles; and
a guideway that is configured and arranged to guide said at least one charge of solid spherical colorant particles dispensed by said at least one solid colorant dispensing unit into the paint container.

7. The solid colorant dispensing unit according to claim 1, wherein the ratio of the standard deviation of the number particle size distribution to the number average particle size of the solid spherical colorant particles is less than 22%.

8. The solid colorant dispensing unit according to claim 1, wherein the number average particle size of the solid spherical colorant particles is in a range of 400-1400 μm.

9. The solid colorant dispensing unit according to claim 8, wherein the number average particle size of a solid spherical colorant particles is in the range of 50-1300 μm.

10. The solid colorant dispensing unit according to claim 1, wherein the plunger is a spring-loaded plunger, wherein when the solenoid is in an inactive state, the spring-loaded plunger is configured and arranged with respect to the dispensing outlet of the nozzle so as to prevent the nozzle from dispensing solid spherical colorant particles, and when the solenoid is in an active state, the spring-loaded plunger is configured and arranged with respect to the dispensing outlet of the nozzle so as to allow the nozzle to dispense solid spherical colorant particles.

11. The solid colorant dispensing unit according to claim 10, wherein the spring-loaded plunger of the solenoid is arranged such that its longitudinal centerline is directed transverse to a longitudinal centerline of the nozzle.

12. The solid colorant dispensing unit according to claim 10, wherein an overflow compartment is provided that is configured and arranged with respect to the dispensing outlet of the nozzle so as to receive solid spherical colorant particles dispensed by the nozzle as a result of a displacement of the spring-loaded plunger in response to switching the solenoid from the active state to the inactive state.

13. The solid colorant dispensing unit according to claim 10, wherein the spring-loaded plunger has a stroke in a range of 5-16 mm.

14. The solid colorant dispensing unit according to claim 10, wherein a detector is provided on an inner surface of the supply container that determines a current height of solid spherical colorant particles in the supply container.

15. The solid colorant dispensing unit according to claim 14, wherein the supply container comprises a first part having the free end portion that is provided with the nozzle and a second part having an end portion that is connected in open communication with an end portion of the first part that is arranged opposite the nozzle thereby providing a transition between the second part and the first part, the first part having a cone-shaped inner wall that with respect to its longitudinal centerline is arranged at an angle ($\alpha$) in a range of 15-55 degree.

16. The solid colorant dispensing unit according to claim 15, wherein the the solenoid is switched from the inactive state to the active state and back to the inactive state to allow the nozzle to dispense a charge of solid spherical colorant particles during the dispersing time interval taking into account at least the diameter of the dispensing outlet of the nozzle, the angle ($\alpha$) of the cone-shaped inner wall of the first part of the supply container, the current stock of solid spherical colorant particles in the supply container, and a response time of the solenoid to switch between the inactive state and the active state.

17. The solid colorant dispensing unit according to claim 15, wherein the angle ($\alpha$) is equal to 30 degrees.

18. The solid colorant dispensing unit according to claim 10, wherein the spring-loaded plunger has a free end part that is arrangeable with respect to the dispensing outlet of the nozzle so as to control dispensing of the solid spherical colorant particles, wherein said free end part has an outer circumference having a shape that is configured to ensure a uniform flow of dispensed solid spherical colorant particles when the free end part partially blocks the dispensing outlet.

19. The tinting machine according to claim 11, wherein the spring-loaded plunger has a free end part that is arrangeable with respect to the dispensing outlet of the nozzle so as to control dispensing of the solid spherical colorant particles, wherein said free end part has an outer circumference having a shape that is configured to ensure a uniform flow of dispensed solid spherical colorant particles when the free end part partially blocks the dispensing outlet, wherein a detector is provided on an inner surface of the supply container that determines a current height of solid spherical colorant particles in the supply container, and wherein the supply container comprises a first part having the free end portion that is provided with the nozzle and a second part having an end portion that is connected in open communication with an end portion of the first part that is arranged opposite the nozzle thereby providing a transition between the second part and the first part, the first part having a cone-shaped inner wall that with respect to its longitudinal centerline is arranged at an angle (α) in a range of 15-55 degrees.

20. A tinting machine having the solid colorant dispensing unit according to claim 19, the tinting machine being configured to tint a base paint composition with at least one charge of solid spherical colorant particles dispensed in a time-controlled way by the at least one solid colorant dispensing unit, the tinting machine comprising:
- a receiving space that is configured and arranged to receive a paint container comprising said base paint composition that is to be tinted using said at least one charge of solid spherical colorant particles; and
- a guideway that is configured and arranged to guide said at least one charge of solid spherical colorant particles dispensed by said at least one solid colorant dispensing unit into the paint container.

21. The tinting machine according to claim 20, wherein an exchangeable cartridge is provided comprising solid spherical colorant particles, the exchangeable cartridge being associated with the supply container so as to provide the supply container with a stock of solid spherical colorant particles and to allow automatic replenishment of said stock in the supply container with solid spherical colorant particles from the exchangeable cartridge, until the exchangeable cartridge is empty, in response to dispensing at least one charge of solid spherical colorant particles via the nozzle, wherein the number average particle size of the solid spherical colorant particles is in a range of 400-1400 μm, and wherein the solid spherical colorant particles comprise 30-97 wt. % of a pigment, less than 5 wt. % of a solvent, and 3-40 wt. % surfactants, wherein wt. % is relative to the total weight of the solid spherical colorant particles.

22. The tinting machine according to claim 21, wherein the dispensing outlet of the nozzle has a diameter in a range of 5-15 mm, and wherein the spring-loaded plunger has a stroke in a range of 5-16 mm.

23. The tinting machine according to claim 22, wherein the solenoid is switched from the inactive state to the active state and back to the inactive state to allow the nozzle to dispense a charge of solid spherical colorant particles during the dispensing time interval taking into account at least the diameter of the dispensing outlet of the nozzle, the angle (α) of the cone-shaped inner wall of the first part of the supply container, the current stock of solid spherical colorant particles in the supply container, and a response time of the solenoid to switch between the inactive state and the active state, wherein an overflow compartment is provided that is configured and arranged with respect to the dispensing outlet of the nozzle so as to receive solid spherical colorant particles dispensed by the nozzle as a result of a displacement of the spring-loaded plunger in response to switching the solenoid from the active state to the inactive state, and wherein a vibratory unit is provided that is configured and arranged to allow the supply container to vibrate at a frequency in a range of 0-55 Hz during operation of the solid colorant dispensing unit.

* * * * *

UNITED STATES PATENT AND TRADEMARK OFFICE
CERTIFICATE OF CORRECTION

Page 1 of 1

PATENT NO.         : 11,592,325 B2
APPLICATION NO.    : 17/436155
DATED              : February 28, 2023
INVENTOR(S)        : Peter Petronella Martinus Thommassen et al.

It is certified that error appears in the above-identified patent and that said Letters Patent is hereby corrected as shown below:

In the Claims

Column 20, Line 51 should read as follows:
19. The solid colorant dispensing unit according to claim 18.

Signed and Sealed this
Eleventh Day of April, 2023

Katherine Kelly Vidal
*Director of the United States Patent and Trademark Office*